United States Patent [19]

Tanno et al.

[11] Patent Number: 4,946,242
[45] Date of Patent: Aug. 7, 1990

[54] OPTICAL PART INCLUDING INTEGRAL COMBINATION OF OPTICAL FIBER AND LIGHT EMITTING OR RECEIVING ELEMENT AND METHOD OF MANUFACTURING THE SAME

[75] Inventors: Seikichi Tanno, Hitachi; Noriaki Taketani, Katsuta; Shuji Eguchi, Hitachi; Hideki Asano, Mito; Yukio Shimazaki, Katsuta; Yuuetsu Takuma, Hitachi; Masahiko Ibamoto, Katsuta; Junji Mukai, Hitachi, all of Japan

[73] Assignees: Hitachi, Ltd.; Hitachi Cable, Ltd., both of Tokyo, Japan

[21] Appl. No.: 234,929

[22] Filed: Aug. 22, 1988

[30] Foreign Application Priority Data

Aug. 28, 1987 [JP] Japan ................ 62-212816

[51] Int. Cl.$^5$ .............................................. G02B 6/26
[52] U.S. Cl. ................................ 350/96.15; 15/339; 68/13 R; 73/499; 250/227.11; 350/96.29; 350/96.34; 356/28
[58] Field of Search ............... 350/96.10, 96.11, 96.12, 350/96.15, 96.16, 96.20, 96.29, 96.30, 96.34, 271-275; 15/339; 60/908; 68/13 R; 73/488, 494, 499; 220/1 B, 900; 250/227; 356/28; 350/271-275

[56] References Cited

U.S. PATENT DOCUMENTS 4,762,381   8/1988   Uemiya et al. ................ 350/96.11

FOREIGN PATENT DOCUMENTS 50-126438  10/1975   Japan .
55-07742    1/1980   Japan .
57-132110   8/1982   Japan .
62-89914    4/1987   Japan .

OTHER PUBLICATIONS

"Optronics", No. 4 (1984), pp. 50-57, Entirely in Japanese.

Primary Examiner—John D. Lee
Attorney, Agent, or Firm—Antonelli, Terry, Stout & Kraus

[57] ABSTRACT

An optical part for light transmission comprises a light conductor formed of a core of a transparent material and a clad of a material having a smaller refractive index than that of the core material, and a light emitting and/or receiving element, wherein the light emitting and/or receiving element is integrally combined with the core of the light conductor by a same material as the core material or by a material having a same refractive index as that of the core material and having a greater rigidity than that of the material forming the clad and/or jacket. The optical part can be used in a high temperature environment as well as a room temperature environment without involving any appreciable loss in light transmission.

37 Claims, 14 Drawing Sheets

FIG. 16A

| EXAMPLE | MONOMER COMPOSITION OF CORE | PROTRUSION AFTER HEATING TEST | MODULAS OF ELASITY ($\times 10^7$ dyn/cm²) UPPER LOW: 25°C / LOWER LOW: 100°C | ADHESIVE STRENGTH BETWEEN CLAD AND CORE (Kg/cm²) |
|---|---|---|---|---|
| 2 | METHYL METHACRYLATE 85g<br>n-BUTYL ACRYLATE 5g<br>ETHYLENEGLYCOL DIMETHACRYLATE 10g | NO | 4000 / 1500 | 35 |
| 3 | METHYL METHACRYLATE 70g<br>POLYETHYLENEGLYCOL DIMETHACRYLATE 30g<br>(n : AROUND 4) | NO | 4100 / 2000 | 30 |
| 4 | METHYL METHACRYLATE 80g<br>POLYETHYLENEGLYCOL DIACRYLATE 20g<br>(n : AROUND 4) | NO | 3800 / 1200 | 34 |
| 5 | HEXYL METHACRYLATE 95g<br>POLYETHYLENEGLYCOL DIACRYLATE 5g<br>(n : 1 TO 2) | NO | 2900 / 1000 | 32 |
| 6 | METHYL METHACRYLATE 70g<br>POLYETHYLENEGLYCOL DIMETHACRYLATE 15g<br>(n : AROUND 14)<br>POLYETHYLENEGLYCOL DIACRYLATE 15g<br>(n : AROUND 14) | NO | 4000 / 2100 | 30 |
| 7 | METHYL METHACRYLATE 60g<br>STEARYL ACRYLATE 10g<br>POLYETHYLENEGLYCOL DIMETHACRYLATE 30g<br>(n : AROUND 23) | NO | 3700 / 1600 | 40 |
| 8 | LAURYL METHACRYLATE 50g<br>POLYETHYLENEGLYCOL DIMETHACRYLATE 50g<br>(n : AROUND 9) | NO | 1600 / 450 | 36 |

FIG. 16B

| | Composition | Protrusion | | |
|---|---|---|---|---|
| 9 | BUTYL ACRYLATE 20g<br>ETHYLENEGLYCOL DIMETHACRYLATE 80g | NO | 3900<br>2000 | 35 |
| 10 | STYRENE 40g<br>ETHYL ACRYLATE 30g<br>POLYETHYLENEGLYCOL DIACRYLATE 30g<br>(n : AROUND 14) | NO | 3900<br>1500 | 29 |
| 11 | OCTYL METHACRYLATE 97g<br>POLYETHYLENEGLYCOL DIMETHACRYLATE 3g | NO | 2500<br>500 | 32 |
| 12 | ETHYL METHACRYLATE 70g<br>BUTYL ACRYLATE 10g<br>POLYETHYLENEGLYCOL DIMETHACRYLATE 20g<br>(n : AROUND 9) | NO | 4000<br>1400 | 34 |
| 13 | ETHYLENEGLYCOL DIMETHACRYLATE 100g<br>(n : AROUND 9) | NO | 1500<br>460 | 33 |
| COMPARATIVE EXAMPLE 1 | SILICONE RESIN "CY-52-113" IN TRADE NAME | PROTRUSION OF ca. 5mm | 20<br>8 | 1.9 |
| COMPARATIVE EXAMPLE 2 | SILICONE RESIN "CY-52-110" IN TRADE NAME | PROTRUSION OF ca. 5mm | 9<br>6 | 2.3 |

NOTE 1 : HEATING TESTS WERE PERFORMED AT 150°C FOR 100 HOURS.
NOTE 2 : POLIMERIZATION INITIATORS AS USED ARE 0.5gr OF LAUROYL PEROXIDE IN 100gr OF MIXTURE FOR THE CORE OF OPTICAL FIBER AND 3.0gr OF BENZOIN ETHYL ETHER FOR THE CORE OF THE ELEMENT ENCAPSULATING PORTION, RESPECTIVELY.
NOTE 3 : CLAD MATERIAL : 4-FLUORO-6-FLUOROPROPYLENE TUBE INNER DIAMETER 1mm $\phi$, THICKNESS 1mm.

OPTICAL PART INCLUDING INTEGRAL COMBINATION OF OPTICAL FIBER AND LIGHT EMITTING OR RECEIVING ELEMENT AND METHOD OF MANUFACTURING THE SAME

FIELD OF THE INVENTION

The present invention generally relates to an optical part, a method of manufacturing the same and applications thereof. More particularly, the present invention is concerned with an optical part composed of a light emitting or receiving element and at least one light conductor in an integrally consolidated or combined unit structure which makes it unnecessary to connect the light emitting or receiving element and the light conductor to each other. The invention further concerns a method of manufacturing the optical part of the above structure. Further, the present invention contemplates provision of light transmission systems incorporating a variety of sensors, optical circuits, display panel illuminators and others each utilizing the inventive optical parts and suited for applications to various electric/electronic apparatuses for domestic use, motor vehicles as well as industrial machines and instruments and others.

BACKGROUND OF THE INVENTION

In conjunction with the connection of a light source such is a light emitting element exemplified by a light emitting diode with a light conductor typified by an optical fiber, there are known a connection realized by making use of an interposed lens system and a connection realized with the aid of a connector as disclosed in "OPTRONICS", No. 4, pp. 50–57 (1984), Japanese Laid-Open Patent Application No. 132110/1982 (JP-A-57-132110) and others. These known connections between the light source element and the optical fiber however require engineering skill of a high order, involving intolerably high expenditure, although loss due to the connection can be suppressed low. Further, the prior art interconnecting techniques are much limited in respect to the applicable field. As simple connecting methods, those illustrated in FIGS. 1A to 1C of the accompanying drawings are known. More specifically, according to the method shown in FIG. 1A, an light emitting diode or LED 2 constituted by a semi-conductor chip connected to lead-out wires 1 and encapsulated in a molded body of resin is directly bonded at a tip end thereof to an optical fiber by means of a bonding agent 5, the optical fiber being composed of a glass core 3 and a glass clad 4. The connection shown in FIG. 1C is similar to the one illustrated in FIG. 1A except that the tip end portion of the LED is formed flat or planar. On the other hand, the connecting structure shown in FIG. 1B is realized in such a manner in which light emitted from the LED 2 is collected by an optical lens 6 to be then directed to an end face of the optical fiber without bonding the latter to the LED.

Although the methods mentioned above rely on the simple connecting techniques, they suffer from significant transmission loss ascribable to the connection and are restricted only to specific applications. The connecting techniques in the prior art mainly concern orientation or disposition of the bonds which can ensure uniform light distribution to the individual optical fibers from the single light source (e.g. angular disposition of the optical fibers relative to the light source). By way of examples, the subject matters of the JP-A-55-7742 and JP-A-50-126438 will be considered. According to the connecting method disclosed in these publication which primarily concerns the angular disposition of the bonds for connecting the single light source to a plurality of optical fibers, there is adopted such a process as illustrated in FIGS. 2A to 2C of the accompanying drawings Referring to FIG. 2A, a plurality of optical fibers 12 have respective end faces brought into contact with the spherical surface of a spherical body 18 so that the optical axes of the optical fibers coincide with the directions normal to the spherical surfaces, respectively. After fixation by a bonding material 14, the spherical body 18 is removed, resulting in a radial array of the optical fibers, which are then connected to a light source 19 in such a manner as shown in FIG. 2B. On the other hand, in the case of the connection shown in FIG. 2C, a plurality of frustoconical members 10 each in the form of a frustrum of cylindrical cone and having a center bore formed for receiving the associated optical fiber 12. The frustoconical members 10 having the optical fibers inserted through the respective center bores are then bundled with the smaller end faces thereof being aligned with one another to thereby form a three-dimensional radial array of the optical fibers, which are then disposed in opposition to a light source 9. However, the connecting methods described above encounter difficulties in practice. In the case of the connecting method shown in FIG. 2A and 2B, for example, it is difficult to hold and maintain the individual optical fibers at respective predetermined positions with proper angles until the optical fibers are fixedly secured together by the bonding material. Besides, there arises a further problem that because the end faces of the optical fibers are likely to be contaminated by a detaching agent used for detaching the optical fiber bundle from the spherical surface of the spherical molding element 18 as well as the bonding material 14, effective utilization or transmission of light is difficult to attain. Similarly, the connecting procedure illustrated in FIG. 2C is very troublesome in practice because of necessity for preparing the frustoconical member for each of the optical fibers. Under the circumstances, the arrangement shown in FIG. 2C is not adopted in practical applications at present.

A method disclosed in JP-A-62-89914 attracts attention in that the problems pointed out above are solved to a great extent. According to this method, a light emitting or receiving element is combined with an optical fiber in an integral structure by using a same material as that of the core of the optical fiber or a material exhibiting a same refractive index as that of the core material of the optical fiber. By virtue of the integrally consolidated combination of the light emitting or receiving element with the light conductor realized according to this method, interconnection of the light emitting or receiving element and the light conductor is rendered unnecessary. Additionally, because the light emitting or receiving element is molded or encapsulated and integrally connected to the optical fiber by a silicon resin having the same refractive index as that of the core material of the light conductor, loss due to the connection can be significantly reduced. It has however been found that this method suffers shortcomings mentioned below. Certainly, this method is not accompanied with practical problems to be mentioned so long as this optical structure is used and operated at a relatively low ambient temperature in the vicinity of room temperature. However, when the optical part incorporating the light emitting or receiving element integrally combined with the light conductors in such a structure as shown in FIG. 14A is employed in the high-temperature atmosphere or environmental condition e.g. at a temperature of 130° C. or higher, the core of the optical fiber protrudes from the end thereof, as is illustrated in FIG. 14B, whereby loss of light due to the leakage at the naked core portion increases significantly. Another problem is found in that delamination or cracking can take place at or in the vicinity of the interface between the light emitting or receiving element and the encapsulating resin, to incur an increase in the loss of light.

SUMMARY OF THE INVENTION

It is therefore an object of the present invention to provide an optical part including an integrally consolidated combination of a light emitting or receiving element and a light conductor for thereby rendering unnecessary the interconnection of the light emitting or receiving element and the light conductor, which optical part can be used even in the high-temperature environment, not to mention of the use at a room temperature, without involving any appreciable loss in the light transmission.

Another object of the present invention is to provide a method of manufacturing the optical part mentioned above.

It is still another object of the present invention to provide light transmission systems in which the optical parts can be utilized and which are suited for use in electric apparatuses for domestic use, motor vehicles, various industrial machines and instruments equipped with various sensors, light circuits, display panel illuminators or others.

When a resin of silicone series is employed for the core material of the light conductor or optical fiber in the optical part including the light emitting or light receiving element and the light conductor in the integrally combined structure as described hereinbefore, the core is likely to protrude outwardly in the high-temperature environment of 130° C. or higher. In other words, a portion of the core where the light emitting or receiving element is embedded tends to project outwardly. Further, delamination occurs at or in the vicinity of the interface between the light emitting or receiving element and the encapsulating resin. These phenomena remarkably degrade the light transmission efficiency. The present invention which envisages improvement of the optical part mentioned above is based on the examination and scrutinization of the causes for the unwanted phenomena mentioned above, as will be explained below.

In general, when a bridging or bridge-making (i.e. cross-linking) resin is used for the core material of a light conductor or optical fiber, a clad or a combined clad and jacket is first formed, into which the core material is then poured to be subsequently cured under heating or through irradiation with ultraviolet rays. At that time, the curing is performed in such conditions that the clad is caused to slightly bulge out or expand outwardly under pressure for the purpose of enhancing intimate adhesion of the clad and the core along the interface therebetween. In other words, the core is so formed as to have an outer diameter slightly greater than the inner diameter of the clad or the clad and jacket combination. Consequently, in the finished state, the optical fiber is placed under a stress because the core is constantly laced in tight by the clad or jacket. Apparently, this stress contributes to enhancement of the closer adhesion between the core and the clad. It is however found that in case a very soft core material is used, the core material is very likely to be squeeze out under the tightening force exerted by the clad. This phenomenon makes appearance more significantly as the temperature becomes higher. In fact, it has been found that the protrusion of the core material takes place within a short time at an elevated temperature higher than 130° C., inclusive thereof.

The cause for the protrusion of the core from the clad or clad and jacket combination will be analytically elucidated below. As described hereinbefore, a tube formed of FEP (4-fluorethylene-6-fluoropropylene resin) and having a diameter represented by dA is filled with a monomer for forming the core and subsequently pressurized. Due to this pressurization, the diameter of the FEP tube is increased to a value dB. In this state, polymerization of monomer takes place, bringing about reduction in volume. Consequently, the diameter of the tube is slightly reduced down to a value dC (inner diameter $d_i$) from dB. As the net effect, the FEP tube is increased in its diameter by $\Delta d_l = dC - dA$ when compared with the original diameter dA. Since the FEP tube has a tendency to restore the original diameter dA, the tube exerts constantly a corresponding clamping or squeezing force onto the core. Upon heating, the core undergoes deformation under this clamping force, as the result of which protrusion of the core takes place. This phenomenon will be explained below in detail by referring to FIGS. 15A to 15C.

In the first place, the clamping force exerted on the core by the clad is considered. It is assumed that an inner pressure is applied to a cylinder having a thin wall, whereby a core is clamped by a force equivalent to the pressure required for the diameter of dA to assume $d_l$. Let's determine the pressure P required for increasing the diameter of the clad by $\Delta d_l = dC - dA$. Stress $\sigma_l$ of the clad in the radial direction is given by $$\sigma_1 = \frac{P \cdot dx \cdot r}{A} = \frac{P \cdot dx \left( \frac{d_o + d_i}{2} \right)}{\left( \frac{d_o - d_i}{2} \right) dx} = \frac{P(d_o + d_i)}{d_o - d_i} \quad (1)$$

where $d_o$ represents the outer diameter of the clad, and $d_i$ represents the inner diameter of the clad (and hence the outer diameter of the core).

Strain $\epsilon_l$ of the clad is given by $$\epsilon_1 = \frac{\sigma_1}{E_1} = \frac{P(d_o + d_i)}{E_1 (d_o - d_i)}$$

The increase $\Delta d_1$ in the diameter of the clad is given by $$\Delta d_1 = \frac{d_1 + d_i}{2} \cdot \epsilon_1 = \frac{P(d_o - d_i)^2}{2 E_1 (d_o - d_i)}$$

Thus, the pressure P for realizing the diameter dC of the clad in the finished optical fiber, starting from the diameter dA of the clad in the state as formed, i.e. the pressure P under which the core is clamped can be expressed as follows:

$$P = \Delta d_1 \frac{2E(e_o - d_i)}{(d_o + d_i)^2} = \frac{\Delta d_1 E_1 t}{r^2} \qquad (2)$$

where t represents a thickness of the clad, and r represents a mean radius of the clad. It is thus apparent that the clamping force is determined in dependence on Young's modulus $E_l$ of the clad and the thickness t thereof for given values of $\Delta d_l$ and r, respectively. In other words, the clamping force corresponds to a product of $E_l$ and t.

Next, deformation of the core due to the clamping force exerted by the clad will be considered.

For the sake of simplification, magnitude of deformation of the core taking place upon application of pressure in the radial direction in the naked state of the core will be considered. When deformation of the core in the radial direction is represented by $\sigma_l$, deformation of the core in the axial direction is by $\sigma_2$, the pressure is by P, the core diameter is by $d_i$, Young's modulus of the core material is by $E_2$, strain of the core material in the radial direction is by $\epsilon_3$, strain of the core material in the axial direction is by $\epsilon_2$, and Poison ratio is represented by $\mu(=\epsilon_3/\epsilon_2)$, then $$\delta_2 = \frac{P \cdot d_i}{E_2}$$

$$\epsilon_3 = \frac{P}{E_2}$$

$$\epsilon_2 = \frac{\epsilon_3}{\mu} = \frac{P}{\mu E_2}$$

Thus, deformation $\delta_l$ of the core in the axial direction is given by $$\delta_1 = \epsilon_2 dx = \frac{P}{\mu E_2} dx \qquad (3)$$

From the expressions (2) and (3), $$\delta_1 = \frac{\Delta d_1 E_1 t}{\mu E_2 r^2} dx \qquad (4)$$

Finally, consideration will be made of the core in the state encapsulated by a clad as well as the friction (adhesion) between the core and the clad. In this case, deformation $\delta_1$ of the core in the axial direction assumes a smaller value than that given by the above expression (4), and can be given by the following expression.

$$\delta_1 = \frac{P}{\mu E_2} dx - \lambda P \pi d/E_2 \qquad (5)$$
$$= \frac{\Delta d E_1 t}{\mu r^2 E_2} dx - \frac{\lambda \pi d_i P}{r^2 E_2}$$

Accordingly, in order to decrease the deformation $\delta_1$ in the axial direction, it is necessary to decrease the value given by the first term in the expression (5) or alternatively increase the second term thereof. Decreasing of the value of the first term can be accomplished by decreasing the product $E_1 \cdot t$ or increasing the Young's modulus $E_2$. For given values of Young's modulus of the core and clamping force, deformation of the core is reduced as the friction (adhesion) $\lambda$ between the core and the clad is increased.

In conclusion, it will be appreciated that suppression of protrusion of the core can be realized by decreasing the value of $E_1 \cdot t$ (product of modulus of elasticity and thickness of the clad) or increasing the value of $E_2$ (modulus of elasticity of the core) or increasing the value of $\lambda$ (adhesion or friction between the core and the clad).

For convenience sake, the quantity $E_1 \cdot t$ will be referred to as the rigidity of the clad with $E_2$ being referred to as rigidity of the core in the following description.

For the reasons elucidated above, the value of the first term of the expression (5) is increased when the clad is formed of a material of fluorine series with the core being formed of a resin of silicone series, because the latter is soft and has a small value of $E_2$. Besides, since the adhesion (friction) $\lambda$ between the resin of fluorine series and the resin of silicone series is very small, the value assumed by the second term of the expression (5) is mall. Consequently, deformation $\delta_1$ of the core in the axial direction is significant. Now, the mechanism of protrusion of the core from the clad in the light conductor will have been understood.

In view of the results of the examination performed on various materials to be used for the core of the optical fiber, the present invention teaches that a hard material should desirably be used for the core material and that a high adhesive strength be ensured between the core and the clad or the clad/jacket combination. More specifically, in the atmosphere or environmental conditions (at low and high temperature) in which the optical part including the light emitting or receiving element and the light conductor in the integral structure is employed, combination of the core material and the clad/jacket material should be so selected that a high adhesive strength can be assured between the core and the clad or the clad and jacket and that the core material has a greater rigidity than that of the clad or the clad and jacket material so that the core material is protected from deformation due to the stress produced under tightening by the clad or the clad/jacket.

Thus, according to a first aspect of the present invention, there is proposed an optical part incorporating a light conductor composed of a transparent core material and a clad of a material having a smaller refractive index than that of the core material and a light emitting or receiving element, wherein the light emitting or receiving element is integrally combined with the light conductor by using a material which is same as the core material or has a same refractive index as that of the core material and higher rigidity than that of the clad or the clad/jacket material and which can assure a high adhesive strength between the core and the clad or the clad/jacket.

According to a second aspect of the present invention, there is proposed the optical part comprising a light conductor formed of a core of a transparent material and a clad of a material having a smaller refractive index than that of the core material and a light emitting or receiving element molded twofold by a transparent bridge-making resin (also known as bridging or cross-linking resin) and another resin having a smaller refractive index than that of the bridge-making (i.e. cross-linking) resin, respectively, wherein the light emitting or receiving element is integrally combined with the light conductor by using a same material as the core material of the light conductor or a material having a same refractive index as that of the core material and exhibiting a higher rigidity than that of the material forming the clad or the clad/jacket in such a manner in which a high adhesive strength can be ensured between the core and the clad/jacket.

The bridge-making resin (i.e. cross-linking resin) for forming the core may be obtained by copolymerization of compositions containing as indispensable components a monofunctional monomer given by the following general formula

(where $R_1$ represents H or $CH_3$ and $R_2$ represents H or a radical selected from a group of alkyls having carbons in a number of 1 to 18,

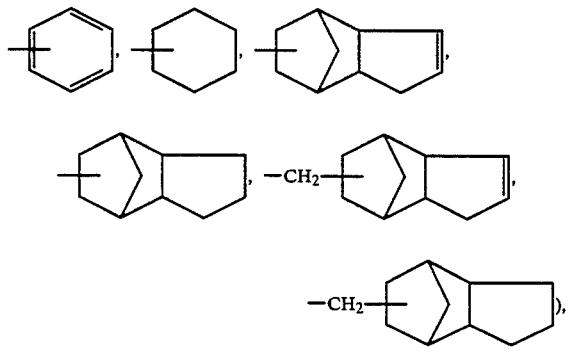

and a polyfunctional monomer given by the following general formula

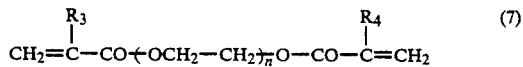

(where $R_3$ and $R_4$ represent radicals selected from a group consisting of H and $CH_3$, and n represents an integer in a range of 1 to 23).

The bridge-making resin may be obtained by copolymerization of compositions containing as an indispensable component a polyfunctional monomer given by the following general formula

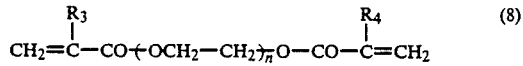

(where $R_3$ and $R_4$ represent radicals selected from a group consisting of H and $CH_3$, and n represents an integer in a range of 1 to 23).

Further, the resin for forming the clad or the clad/jacket and having a small refractive index may be obtained by copolymerization of tetrafluoroethylene and hexafluoropropylene.

According to a third aspect of the present invention, there is proposed a method of manufacturing an optical part comprising a light conductor composed of a core of a transparent core material and a clad of clad material having a smaller refractive index than that of the core material and a light emitting or receiving element, the method comprising step of molding the light emitting or receiving element with a same material as the core material of the light conductor or a material having a same refractive index as that of the core material, the molding material capable of assuring a high adhesive strength between the core and the clad/jacket and having a greater rigidity than that of the clad or the clad/jacket, and a step of molding the surface of the encapsulated light emitting or receiving element with a same material as the clad material of the light conductor or a material having a same refractive index as that of the clad material, whereby the light emitting or receiving element is integrally combined with the light conductor.

According to a fourth aspect of the present invention, there is proposed a method of manufacturing an optical part comprising a light conductor composed of a core formed of a transparent core material and a clad formed of a clad material having a smaller refractive index than that of the core material and a light emitting or receiving element molded twofold with a transparent bridge-making resin and a resin having a smaller refractive index than that of the bridge-making resin, wherein the light-emitting or receiving element is encapsulated with a same material as the core material or a material having a same refractive index as that of the core material and further having a greater rigidity that of the clad of the clad/jacket, said material being capable of assuring a high adhesive strength between the core and the clad or the clad/jacket, the surface of the encapsulated light emitting or receiving element being further encapsulated with a same material as the clad material of the light conductor or a material having a same refractive index as that of the clad material, whereby the light emitting and/or receiving element is integrally combined with the light conductor. The bridge-making material should preferably selected from those mentioned hereinbefore in conjunction with the second aspect of the present invention.

According to a fifth aspect of the present invention, there is proposed a light detecting optical part which comprises a light sensor for detecting a medium interposed between a light emitting element and a light receiving element, and a light conductor composed of a core formed of a transparent core material and a clad formed of a clad material having a smaller refractive index than that of the core material, wherein the light emitting and/or receiving element is integrally combined with the core through the medium of a same material as the core material or a material having a same refractive index as that of the core material. In typical examples of applications of the light detecting optical part mentioned above, the optical part may be employed as a part of an automatic washing machine, as a part of an automated cleaner, as a part of a motor vehicle equipped with a gasoline and/or oil tank, as a part of an industrial machine equipped with a gasoline and/or oil tank, as a display device by providing light leaking portions in the clad, as an optical sensor in a rotation number measuring instrument for detecting rotational angle and others.

According to a sixth aspect of the present invention, there is proposed an optical transmission system for transmitting information or energy by making use of light transmission between a light emitting element and a light receiving element, wherein the optical transmission system comprises an optical part including a light conductor composed of a core formed of a transparent core material and a clad formed of a core material having a smaller refractive index than that of the core material and a light emitting or receiving element integrally combined with the core through the medium of a same material as the core material or a material having a same refractive index as that of the core material.

By virtue of the abovementioned structures of the optical part according to the present invention in which the light emitting or receiving element is integrally combined with the light conductor, transmission loss of light due to the connection between the light emitting or receiving element and the light conductor can be significantly decreased or avoided, whereby the light of a light source can be utilized with a remarkably enhanced efficiency. Besides, the connection between the light emitting or receiving element and the light conductor which presents the greatest obstacle in the practical applicabilities can be omitted. Additionally, because the difficulty or problem that the transmission loss is increased in the high temperature atmosphere or environment in the case of the prior art assembly of the light emitting or receiving element and the light conductor can be solved to a satisfactory extent according to the teachings of the present invention, the optical part of the invention can enjoy a very extensive variety of applications including not only the industrial machines and instruments but also apparatuses for domestic and public use such as electric apparatus for home use, motor vehicles and others, not to speak of the specific fields in which the prior art device have been employed.

As described hereinbefore, the present invention provides a method of combining a light emitting or receiving element integrally with a light conductor by molding with a transparent resin, wherein the molding material (core material) can exhibit a high adhesive strength to the clad and has a greater rigidity than that of the clad or the clad/jacket combination. More specifically, the light emitting or receiving element is encapsulated by a same material as the core material of the light conductor or a material exhibiting a same refractive index as that of the core material through molding, being then followed by encapsulation with a same material as the clad material of the light conductor or a material exhibiting the same refractive index as that of the clad material. According to this method, the light emitting or receiving element is embedded in the two-layer laminate structure as with the case of the light conductor, whereby integral or consolidated combination of the light emitting or receiving element with the light conductor can be realized satisfactorily. Of course, the method of manufacturing the optical part of the integrally combined structure according to the teachings of the present invention is not restricted to the abovementioned method. There are conceivable many other manufacturing methods for realizing the integral structure of the combined light emitting or receiving element and the light conductor, so far as the latter can be implemented in the two-layer structure. By way of example, the clad of the light conductor may first be fabricated and subsequently a core material may be poured into the clad, being then followed by a step of embedding the light emitting or receiving element within the core material.

Concerning the materials which can be employed in carrying out the invention, the core material must ensure a high adhesive strength between the core and the clad or clad/jacket and exhibit indispensably a greater rigidity than that of the clad or the clad/jacket material. As typical examples of the core material, those mentioned hereinbefore are preferred. However, so far as the requisite conditions described hereinbefore are satisfied, other materials can be used such as, for example, homopolymers or copolymers of aromatic vinyl monomers, and copolymers of acrylic or methacrylic monomers and aromatic vinyl monomers For the clad, tetrafluoroethylene-hexafluoropropylene (FEP) may be employed. However, it is required that the clad material has a smaller refractive index than the core material.

In a preferred mode of carrying out the present invention, the core material encapsulating the light emitting or receiving element should exhibit a same refractive index as that of the core material of the light conductor, while the clad material encapsulating the light emitting or receiving element should have a same refractive index as that of the clad material of the light conductor. In that case, the transmission loss of light can be more significantly decreased to advantage. To this end, it is most preferred that the same materials should be employed for both of the light emitting or receiving element encapsulating layers and the light conductor.

The optical part including the light emitting or receiving element and the light conductor in an integral structure is excellent in respect to the light transmission efficiency and can enjoy significantly extended fields of applications.

More specifically, the prior art optical part which always necessitates the interconnection between the light emitting or receiving element and the light conductor suffers remarkable loss of light due to the connection and requires a high skill in order to reduce the transmission loss to the level at which the optical part can practically be made use of. Under the circumstances, when an unexpected failure occurs in the optical part, it is practically impossible to repair the failed optical part at the level, for example, of distributors or service stations of the electric apparatuses for home use, repair shops of motor vehicles and others. For this reason, the industrial field of utilization of the optical part known heretofore has been extremely restricted, notwithstanding of the fact that there exists great demand for such optical parts in numerous and various fields. In reality, employment of the optical part is limited to only a few specific industrial fields in spite of unfathomable utility thereof, much less in the field of the household electrical apparatus.

In contrast, the optical part according to the present invention can be advantageously used in various fields inclusive of those where the prior art optical part could not find application, such as, for example, in washing machines for detecting degree of contamination of water, in a cleaner for detecting the amount of dusts as collected, in various household electric apparatuses, in a rotation angle sensor or revolution number sensor, in motor vehicles as a sensor for indicating the amounts of gasoline and oil as well as determining the use life of the latter. Needless to say, the optical sensors are far more excellent and advantageous than the sensors of electrical nature in numerous and various household electric apparatuses and equipment, motor vehicles, industrial machines and instruments. Thus, the present invention which allows the electrical sensors used heretofore to be replaced by optical sensors makes epoch-making contribution to the development and improvement of numerous apparatuses and machines where applicable.

Besides, the optical part according to the present invention can find its application in various electrical circuits in addition to the sensors mentioned above to such an extent that enumeration of the individual applications can encounter no limit. By way of typical example, suppose a circuit disposed in the vicinity of a high voltage unit. Needless to say, such circuit will suffer from remarkable noise. This problem can be solved once for all by using an optical or light circuit. However, also in this field, the interconnection of the light emitting or receiving element and the light conductor has presented a great obstacle, making it substantially impossible to use the optical circuit. The teachings of the present invention now permits the optical or light circuit to be practically employed also in this field.

Further, let us consider the field of illumination for the display. Obviously, the use of a LED (light emission diode) for a light source in one-to-one correspondence with a light conductor is inferior to the use of a combination of a single light source and a plurality of light conductors or optical fibers in that different places can be illuminated by the single light source in the latter case. Heretofore, however, the arrangement of the light source and the light conductor in one-to-one correspondence has been necessarily adopted while submitting to illumination of a single place or location because of the obstacle encountered in the connection of the LED and the light conductor. In other words, many locations to be illuminated requires a corresponding number of LEDs. In contrast, with the aid of the optical part taught by the present invention which can be realized in the form of integral combination of an LED with the light conductor or conductors such as optical fiber or fibers, it is possible to utilize the light source most effectively without need for any expensive connector or lens system. Finally, it should be mentioned that the optical part according to the present invention which can be connected directly to an electric circuits can also be employed in control panels of various industrial machines and equipment in addition to household apparatuses, motor vehicles and others.

As will now be appreciated from the foregoing description, according to the present invention which envisages an integral combination of a light emitting or receiving element with a light conductor, transmission loss of light which would otherwise become intolerably high due to connection between the light emitting or receiving element and the light conductor can be significantly decreased. Further, because of no necessity for connecting the light emitting or receiving element and the light conductor, the optical part according to the present invention can be directly or straightforwardly connected to electric circuits and others. In other words, the greatest difficulty encountered in the attempts for employing the light emitting or receiving element and light conductor in many practical applications because of high skillfulness required for the connection of them has been eliminated once for all according to the teachings of the present invention. With the advent of the optical part according to the invention, it is promisingly expected that the optical technology find its practical applications extensively over numerous and various fields inclusive of the field of household apparatuses, much more the industrial equipment and machines.

The above and other objects, features and attendant advantages of the present invention will be more apparent upon consideration of the following description of the exemplary and preferred embodiments taken in conjunction with the accompanying drawings.

BRIEF DESCRIPTION OF THE DRAWINGS

FIGS. 16A and 16B are views showing as listed in a table, those compositions of materials as employed in the examples 2 to 13 of the mode for carrying out the present invention and the comparative examples 1 and 2 as well as the results of heating test performed on the corresponding optical parts.

DESCRIPTION OF THE PREFERRED EMBODIMENTS

Now, the present invention will be described in conjunction with exemplary embodiments thereof. The description will be made of methods for manufacturing an optical part including a light emitting element integrally coupled or combined with light conductor(s) and typical applications of the optical part in this order.

EXAMPLE 1

(1) Preparation of monomer composition for the core material of light conductor, containing:
70 g of methyl methacrylate,
20 g of ethylene glycol dimethacrylate, 10 g of butyl acrylate, and 0.5 g of lauroyl peroxide (as thermal polymerization initiator).

(2) Preparation of monomer composition for the core material for combining a light emitting element and a light conductor integrally with each other, containing:

70 g of methyl methacrylate, 20 g of ethylene glycol dimethacrylate, 10 g of butyl acrylate, and 3.0 g of benzoin ethyl ether (as ultraviolet polymerization initiator).

Figure 1A:
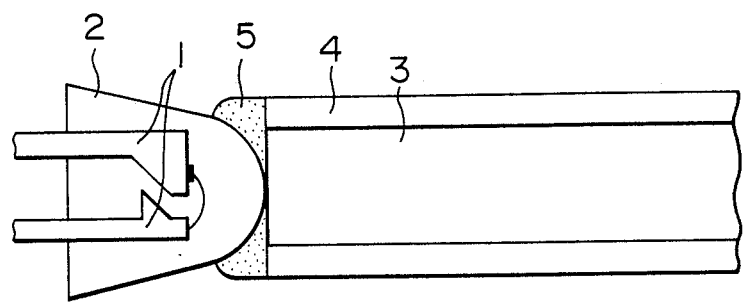
FIGS. 1A to 1C are views for illustrating schematically conventional methods of combining a light emitting element with a single optical fiber.
Figure 1B:
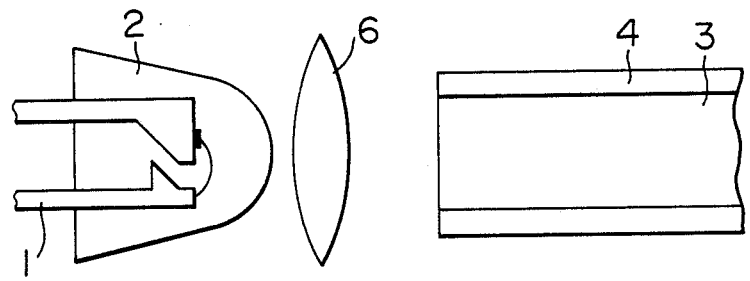
Figure 1C:
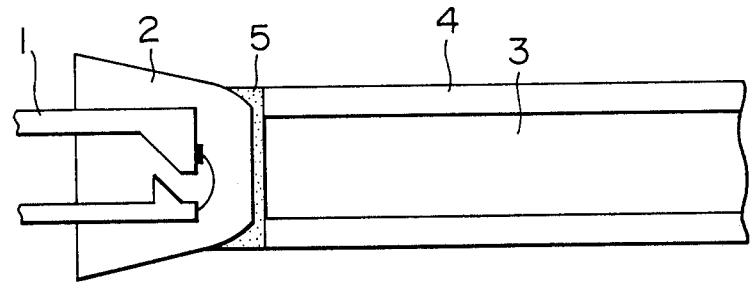
Figure 2A:
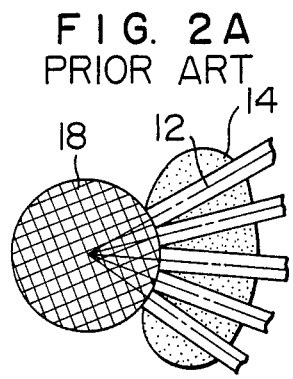
FIGS. 2A to 2C are views for illustrating schematically hitherto known methods of combining a light emitting element with a plurality of light conductors.
Figure 2B:
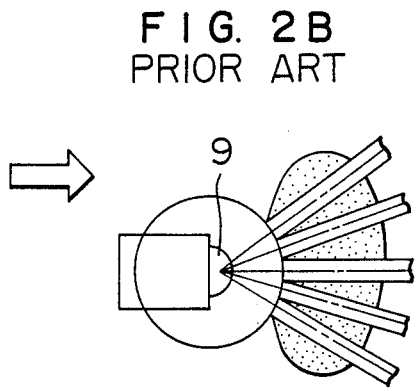
Figure 2C:
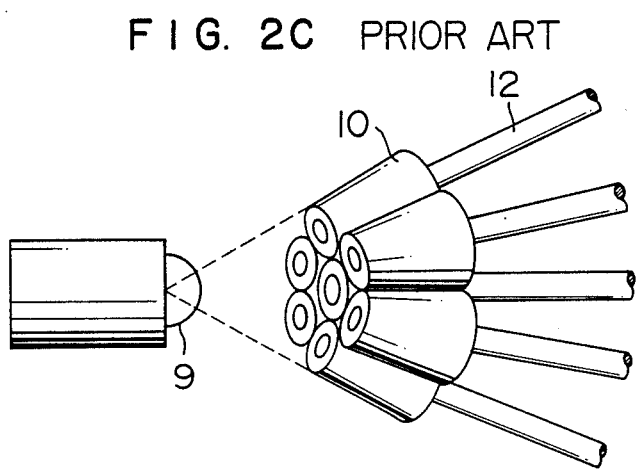
Figure 3A:
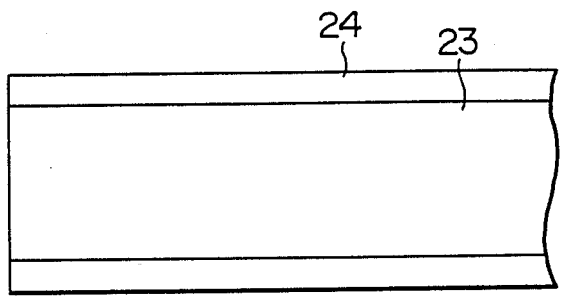
FIGS. 3A to 3C are views for illustrating a method of combining a light emitting element integrally with a single optical fiber according to an embodiment of the present invention.
Figure 3B:
Figure 3B:
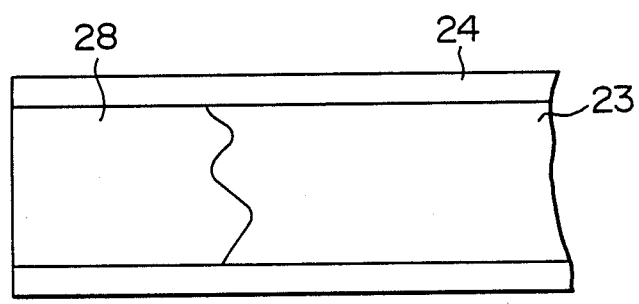
Figure 3C:
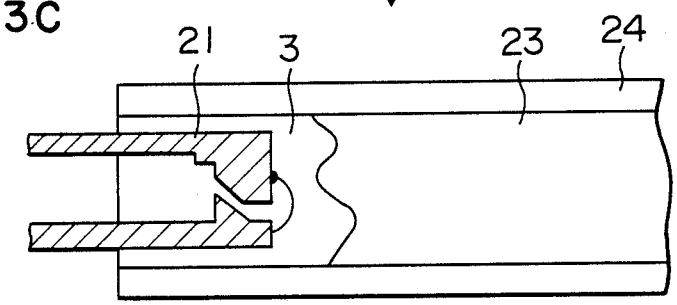

(3) Integral combination of a light emitting (or receiving) element with a light conductor:

FIGS. 3A to 3C illustrate stepwise a process of integrally combining a single LED (light emitting diode) to an end portion of an optical fiber which has been fabricated through thermal polymerization of a tube formed of FEP (4-fluoroethylene-6-fluoropropylene resin) for serving as the clad and filled with the monomer of the composition (1) mentioned above. More specifically, FIG. 3A shows in an enlarged view an end portion of the optical fiber, in which a reference numeral 23 denotes the core of the optical fiber and numeral 24 denotes the clad. Referring to FIG. 3B, the end portion of the optical fiber shown in FIG. 3A is collapsed to remove only the core material at the end portion from the optical fiber. As a result, there is formed a hollow space 28 at the end portion of the optical fiber. The LED element 21 (a light emitting element having the bare surface without being coated with any transparent resin) is subsequently inserted into the hollow space 28, which is then followed by pouring of the aforementioned monomer composition (2) into the clad or FED tube 24, as shown in FIG. 3C. Finally, the end portion of concern is irradiated with ultraviolet rays to effectuate the polymerization. As the result of this process, there can be realized an optical part including the light emitting element and the optical fiber in the integrally consolidated or combined structure, wherein no difference is present in respect to the refractive index between the LED encapsulating material and the core material because both are of the same composition, while the clad 24 undergoes no modification and remains intact as the integral part of the optical fiber. It is self-explanatory that the LED element can be replaced by a light receiving element.

The optical part thus obtained was left in the atmosphere of 150° C. for 100 hours. The problem that the core material protrudes outwardly beyond the edge of the clad was not observed.

EXAMPLES 2 to 13

In the manner similar to the preceding example 1, the processes of manufacturing optical parts were carried out by employing the monomer compositions listed in the table shown in FIG. 16 with the FEP tube being used mentioned in conjunction with the Example 1, for the clad. The optical parts each including the light emitting or receiving element and the optical fiber combined integrally were subjected to a heat withstanding test at a temperature of 150° C. for 100 hours. None of the optical parts undergone the test showed the unwanted phenomenon that the core material protrudes outwardly.

COMPARATIVE EXAMPLE 1

A tube formed of FEP and having a diameter of 1 mm was filled with a silicone resin commercially available under the trade name "CY52-113" and heated to a temperature of 100° C. for three hours to fabricate an optical fiber, which was then cut in a length of 2 m for manufacturing an optical part including a light emitting element combined integrally with the optical fiber according to a method mentioned below. A tip portion of the optical fiber cut in the length of 2 m was heated at ca. 100° C. to be softened, whereupon a core was removed over the length of about 10 mm. An LED element (i.e. element not molded in a resin) is placed in a hollow space of the optical fiber left after the removal of the core material. Subsequently, the silicone resin "CY52-113" used as the core material in fabrication of the optical fiber was injected into the hollow place containing the LED element and cured by heating at 100° C. Thus, an integral combination of the optical fiber and the LED element was obtained.

The optical part manufactured according to the method mentioned above was left in the atmosphere of 150° C. for 100 hours. It was found that the core protrudes beyond the clad at both ends of the optical fiber inclusive of the end portion where the LED element is embedded.

COMPARATIVE EXAMPLE 2

An optical part was manufacture in the same manner as the comparative example 1 except that a silicone resin commercially available under the trade name "CY52-110" was used as the core material. The thermal test carried out on the same conditions as in the case of the comparative example 2 shows that the core portion projects beyond the clad of the optical fiber.

EXAMPLES 14 to 16

Figure 4A:
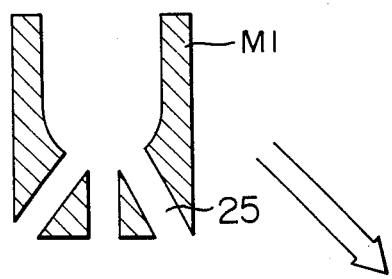
FIGS. 4A to 4D are views for illustrating a method of combining a light emitting element integrally with a plurality of optical fibers according to another embodiment of the present invention.
Figure 4B:
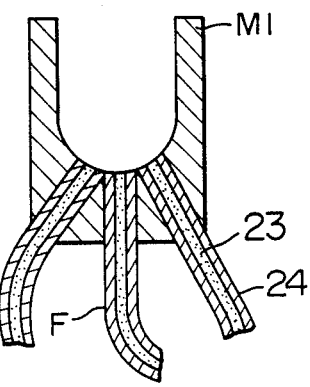
Figure 4C:
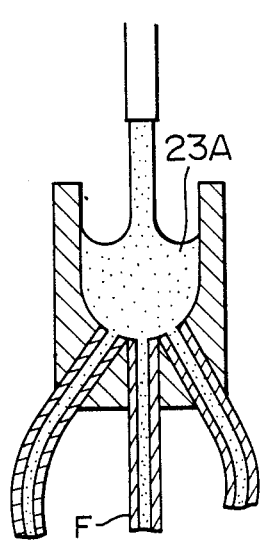
Figure 4D:
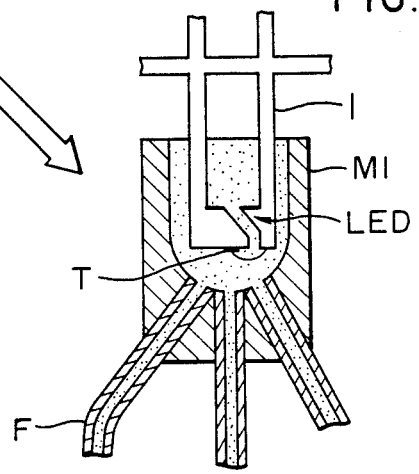

The core material used in this example was same as the composition employed in the Example 1. The same applies to the Examples 17 and 18 mentioned below. Now, referring to FIG. 4A to 4D, the instant example 16 will be described, which is directed to the integral coupling of plural optical fibers to a single LED element T. In FIG. 4A, a reference symbol M1 denotes a mold member provided with bores 25 for mounting therein a corresponding number of the optical fibers in such disposition that the axes of the optical fibers extend, respectively, perpendicularly to the directions tangential to a surface of an inner spherical wall of the mold member having the center where the LED element is to be positioned. The mold member M1 is formed of a same material as the clad material of the optical fiber also by molding. The optical fibers F each composed of the core 23 and the clad 24 are inserted into respective mounting bores 25 of the mold member M, as shown in FIG. 4B. Subsequently, the monomer composition 23A used for forming the core material 23 of the optical fiber F is poured into the mold member M1, as shown in FIG. 4C. Next, a semiconductor chip T of LED attached with a lead frame 1 is positioned at the center of the inner spherical surface of the mold M1, as shown in FIG. 4D. Finally, the monomer composition 23A poured into the mold M1 is polymerized under heating, as a result of which an optical part incorporating the single LED integrated with the plurality of optical fibers is realized. Since the LED molding material, i.e. the core material encapsulating the LED, is same as the core material 23 of the optical fiber and additionally the clad material of the LED (i.e. the material of the mold M1) is same as the clad material 34 of the optical fiber, the light source constituted by the LED can be utilized with high efficiency. Typical applications of the optical part obtained in this way will be described hereinafter. Obviously, the LED element can be replaced by a light receiving element such as, for example, a photodiode.

EXAMPLE 15

Figure 5A:
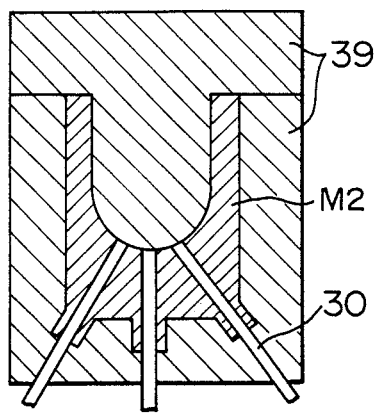
FIGS. 5A to 5D and FIGS. 6A to 6D are views for illustrating further methods of combining a plurality of optical fibers integrally with a light emitting element according to further embodiment of the invention, respectively.
Figure 5B:
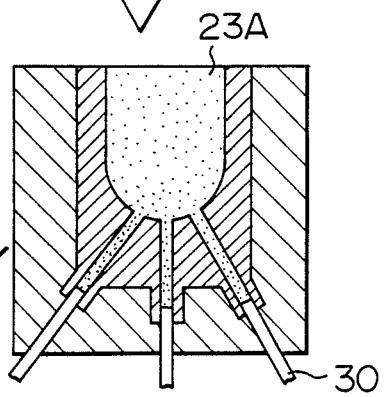
Figure 5C:
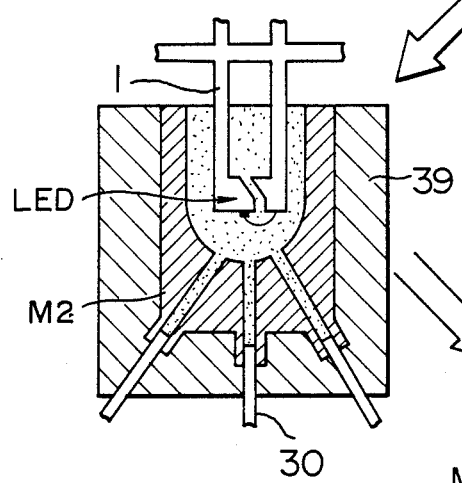
Figure 5D:
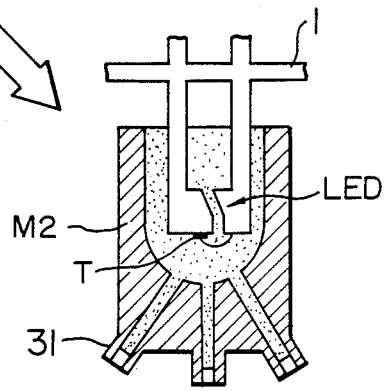

With this example, it was envisaged to combine a plurality of light waveguides or light connectors integrally with a single LED. At first, a mold member M2 having a set of light connectors generally denoted by 31 is formed by using a molding die 39 having rod pins 30 each in the form of a circular column and disposed so that the axes of the rod pins 30 extend perpendicularly to the directions tangential to a spherical mold surface having the center where the LED is to be positioned, as is shown in FIG. 5A. Subsequently, the top member of the molding die 39 is removed with the rod pins 30 being withdrawn, as is shown in FIG. 5B. Next, a transparent molding material 23A is poured, being followed by the placement of the LED element attached to a lead frame 1, as shown in FIG. 5C. After having cured the transparent molding material 23A, the molding die body 39 is detached, whereupon an optical part including the LED combined integrally with the plurality of the light waveguides or the light connection 31 was obtained. By virtue of the connector assembly, a corresponding number of the optical fibers may be connected to the LED in a facilitated manner. The electrodes of the LED can be directly connected to an electric circuit.

EXAMPLE 16

Figure 6A:
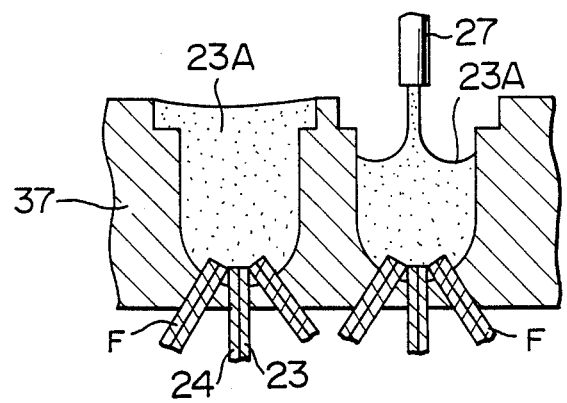
Figure 6B:
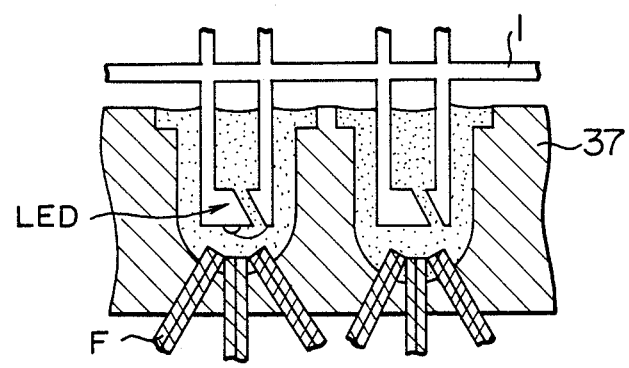
Figures 6C, 6D:
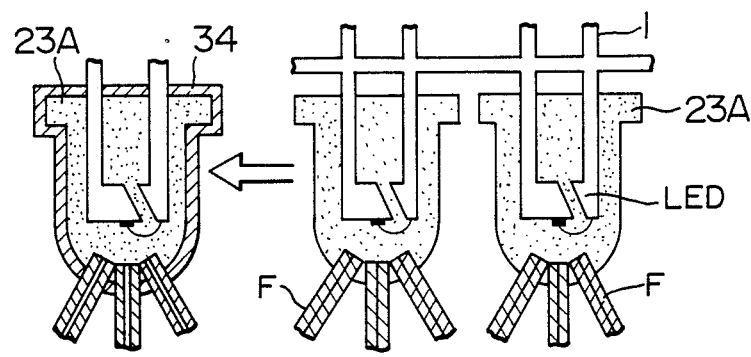

This example is directed to a method of manufacturing an optical part including an integral combination of a LED element and a plurality of optical fibers and will be described by reference to FIGS. 6A to 6D. A molding die 37 employed in carrying out the instant example has a plurality of bores having respective axes coinciding with the directions normal to the inner spherical mold surface having the center at the position where the LED element is to be disposed. A corresponding number of optical fibers F each composed of a core 23 and a clad 24 are inserted into the bores, respectively. Subsequently, a molding material 23A having the same monomer composition as the material used in fabricating the optical fiber is poured into the molding die through a molding resin injecting nozzle 27, as shown in FIG. 6A. Next, the LED attached to the lead frame 1 is disposed at the predetermined position, i.e. at the center of the spherical wall of the molding chamber, as shown in FIG. 6B. In this state, the curing process is carried out. Upon completion of the curing reaction, the die 37 id detached, as shown in FIG. 6C. Next, the molded product is immersed in a bath of solution of polymer having the same refractive index as that of the clad material 24 of the optical fiber F, to thereby coat the whole surface of the molded material (core material) encapsulating the LED element and partially the surface of the optical fibers F with the coating material 34. In this way, the LED element is enclosed by two layers formed of the core material 23A and the clad material 34, respectively, as in the case of the optical fiber. Since the core material 23A and the clad material 34 have respective refractive indexes identical with those of the core and the clad of the optical fiber, there can be realized an optical part in which the light source (LED) and the light guides (optical fibers) are integrally consolidated or combined. With the structure of this optical part, it is possible to guide or transmit the light to desired places by way of the integrally coupled optical fibers in a much simplified manner without need for use of any optical connector by simply connecting the terminals of the LED to an electric circuit.

In the foregoing, manufacture of the optical parts in which the light emitting element is integrally coupled or combined with the light guide(s) has been described by enumerating the illustrative examples. Although it has been assumed that the LED element is used, it will readily be understood that the manufacturing method can be carried out in the utterly same manner when a semiconductor laser element or a light receiving element is employed.

Having described the manufacture of the optical part incorporating the light emitting (or light receiving) element integrally combined with light guides (optical fiber), description will now be turned to exemplary or typical applications of such optical part.

Figure 7A:
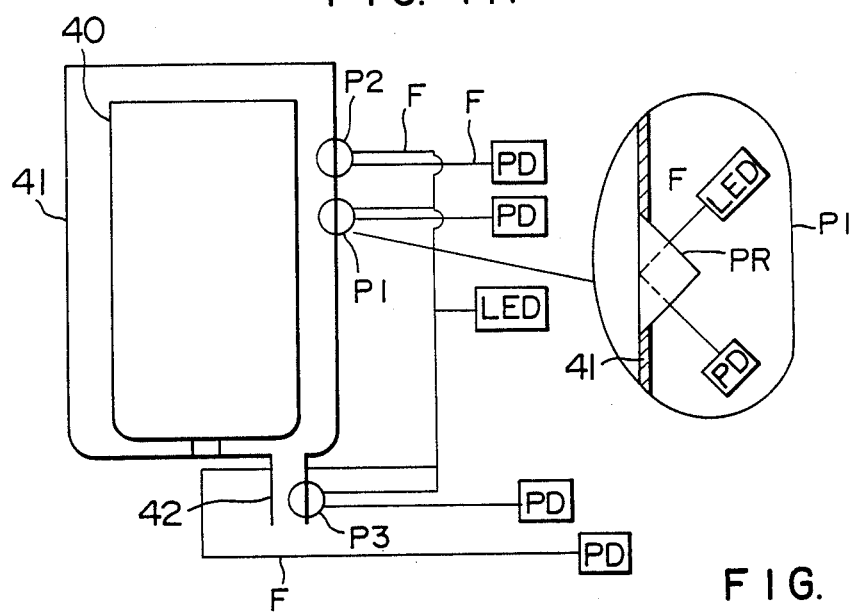
FIGS. 7A and 7B are schematic diagrams showing a structure of an electrical washing machine in which optical parts according to the invention are employed.
Figure 7B:
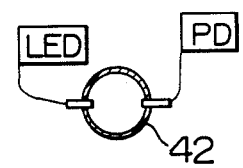
Figure 8A:
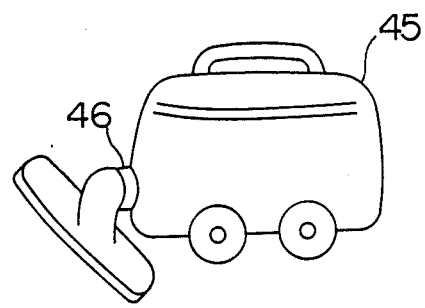
FIGS. 8A and 8B are schematic diagrams showing a structure of an electric cleaner to which optical parts according to the invention are used.
Figure 8B:
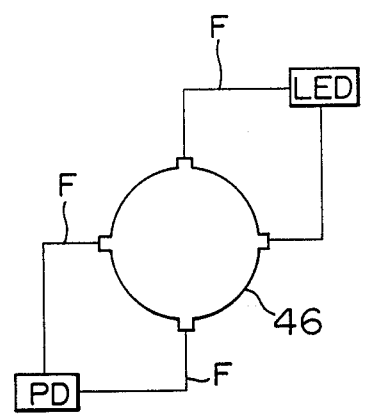

FIGS. 7A and 7B and FIGS. 8A and 8B illustrate, by way of example only, applications of the optical part including the integral combination of the light emitting or receiving element and the light guides (optical fibers) to electric apparatuses for domestic use. More specifically, FIGS. 7A and 7B shows application of the optical part to a washing machine, while FIGS. 8A and 8B show application to an electric cleaner. At first, description will be made of the application to the washing machine by reference to FIGS. 7A and 7B. The illustrated washing machine includes an inner casing 40 and an outer casing 41 having a drain port 42 formed at the bottom thereof. Optical sensors P1 and P2 for indicating water level are installed on the upstanding wall of the outer casing 41 at two vertically different upper locations. A third sensor P3 for indicating the degree of contamination of the washing water is installed in the vicinity of the drain port or pipe 42. A structure of the level sensor P1 is shown in an enlarged view encircled by a solid line in FIG. 7A. As will be seen, a prism PR is mounted on the wall, while a first optical part including an integral combination of a light emitting element LED and an optical fiber F according to the present invention is installed together with a second inventive optical part including a light receiving element (e.g. photodiode) PD and an optical fiber F in the integral structure, wherein the light emitted by the LED of the first optical part is introduced to the prism PR through the associated optical fiber F, the light reflected at a prism face being transmitted to the photodiode PD through the medium of the associated optical fiber. In this connection, it should be noted that the reflecting face of the prism PR defines a part of the inner wall surface of the outer casing 41. Needless to say, the angle of reflection at the prism face of concern assumes different values between the state where the reflecting face of prism is in contact with the air and the state in which the reflecting face is in contact with water. Consequently, the amount of light impinging on the photodiode PD varies when the water head has attained such level at which water is brought into contact with the reflecting face of the prism. Thus, it is possible to detect the water level within the washing machine.

By coordinating appropriately the circuit of the photodiode PD and an electromagnetic switch circuit provided in association with a water intake pipe (not shown), water supply to the washing machine can be automatically and reliability controlled. Further, by mounting the above-mentioned sensors P1 and P2 at two different levels, the different amounts of washing water can be selectively used.

With the sensor P3 constituted by the LED and the photodiode PD as described above and installed in association with the drain port 42, it can be detected positively whether the water has been discharged completely. Further, by providing a first inventive optical part including the integral combination of a light emitting element and an optical fiber together with a second inventive optical part including integrally combined light receiving element and a optical fiber at the drain port in the manner shown in FIG. 7B, the degree of contamination of water can be detected not only in the washing mode but also in the rinsing mode, whereby the durations of these operations can be properly controlled. More specifically, in the arrangement of the optical parts shown in FIG. 7B, the first optical part incorporating the LED disposed in opposition to the second optical part including the light receiving element diametrically across the drain pipe 42. Consequently, as the water flowing between these optical parts becomes contaminated, the intensity of light transmitted to the light receiving element or photodiode PD is more decreased. On the contrary, as the rinsing operation proceeds with, transparency of water flowing through the drain pipe 42 is increased, resulting in a corresponding increase in the intensity of light transmitted to the light receiving element or photodiode PD. Thus, the time point for terminating the rinsing operation can be determined appropriately.

The washing machine is by nature a water handling apparatus. Accordingly, employment of an electric sensor for the purposes described above is likely to involve many troubles such as leakage of electricity. For this reason, the use of an optical sensor has heretofore been desired and attempted. However, because of the difficulties encountered in connecting the light emitting and/or receiving element to the light guide or optical fiber, as described hereinbefore, practical application of the optical sensor for detection of water level and contamination of water has been unsuccessful. With the advent of the optical part including a light emitting or receiving element combined integrally with light guide according to the present invention, application of the optical sensors to the washing machine and other household apparatuses for various purposes is not practicable without need for any optical connector. It is sufficient for operation of the optical part according to the invention to connect the electrodes of the light emitting or receiving element to an appropriate electric circuit.

FIGS. 8A and 8B show application of the optical part including the integral combination of the light emitting or receiving element and the light guide (optical fiber) according to the invention to an electric cleaner, by way of example. Referring to FIG. 8A, a combination of sensors, i.e. a first optical part composed of an integral combination of a light emitting element LED and optical fibers F and a second optical part composed of integrally combined light receiving element PD and optical fibers F are mounted in diametrical opposition to each other around a suction port 46 of the cleaner 45. Passage of dusts through the suction port 46 results in a decrease in the amount of light transmitted to the light receiving element PD, which in turn means that the amount of dusts as sucked can be determined. More specifically, by making use of information available from the output of the light receiving element PD in an appropriate electric circuit for controlling a drive unit geared to the wheels of the cleaner, there can be realized an unmanned cleaner capable of detecting the cleaned place and moving to other area under command.

Figure 9:
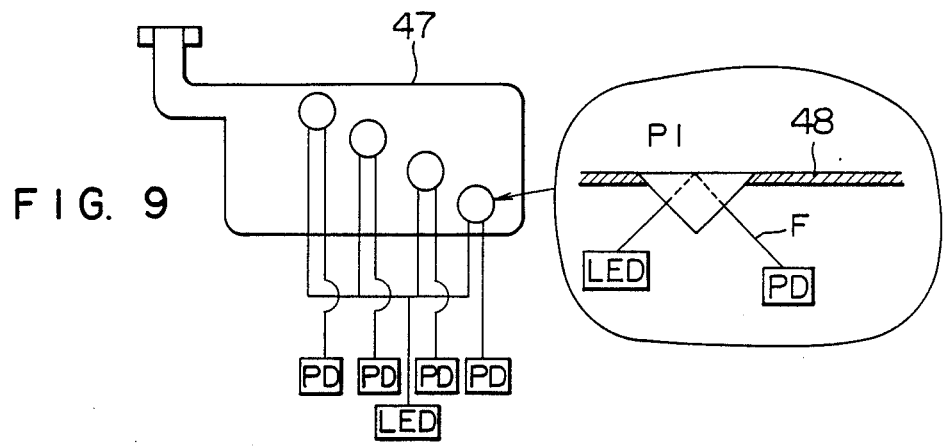
FIGS. 9 and 10 are schematic diagrams showing a structure of a gasoline tank in which optical parts according to the present invention are employed.

FIG. 9 shows application of the optical part according to the invention to a gasoline tank or a gear box of a motor vehicle for the purpose of detecting the amount of gasoline or oil and the use life of the latter.

Referring to FIG. 9, four prism-type sensors are mounted on a tank wall 48 of a gasoline tank 47. Each sensor is implemented in a structure similar to the one shown as enlarged in FIG. 7A and comprises a first optical part including an integral combination of a LED (light emitting diode) and an optical fiber F, a second optical part including an integral combination of a light receiving element (e.g. photodiode) and an optical fiber and a prism PR having a reflecting face Pl defining an integral part of a wall of the gasoline tank 47. The reflecting face of the prism PR is brought into contact with the air or gasoline in dependence on the level of the latter within the tank 47. Since gasoline and the air differ from each other in respect to the refractive index, the angle at which the incident light produced by the LED and transmitted through the optical fiber F is reflected at the prism face Pl assumes different values between the state where the prism face Pl is in contact with gasoline and the state where the former is in contact with the air, resulting in variation in the amount of light impinging on the photodiode PD through the optical fiber F of the second optical part. The information available from the output of the light receiving element PD can be utilized for determining the presence or absence of gasoline within the tank. Further, by installing a plurality of the sensors each of the structure described above, the remaining amount of gasoline can be detected.

Employment of an electric sensor for the purpose mentioned above would be accompanied with danger of explosion of gasoline. However, such danger can be completely excluded by using the optical sensor constituted by the optical parts according to the invention. In other words, presence or absence of gasoline within the tank can be detected positively with enhanced safety according to the teachings of the present invention.

Figure 10:
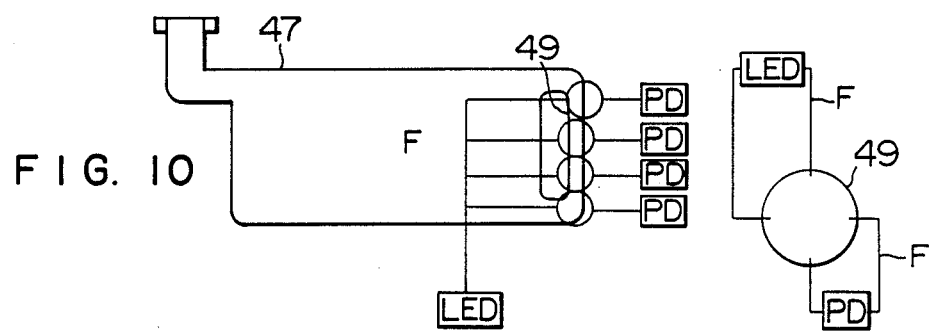

FIG. 10 shows another application of the inventive optical parts to the gasoline tank of a motor vehicle for measuring the amount of gasoline within a tank 47. The arrangement shown in FIG. 10 differs from the one shown in FIG. 9 with regard to the combination and installation of the sensors. More specifically, in the case of the arrangement shown in FIG. 10, auxiliary pipes 49 are installed in the gasoline tank 47, wherein each o the auxiliary pipes is equipped with a sensor arrangement comprising a first optical part including integral combination of a light emitting element LED and optical fibers F and a second optical part including integral combination of a light receiving element PD and optical fibers F, the first and second optical parts being disposed diametrically oppositely to each other around the pipe 49, as shown in a partially enlarged view encircled by a solid line, wherein the light emitted by the LED of the first optical part is received by the light receiving element PD of the second optical part. Absence or presence of gasoline can be determined on the basis of the output of the light receiving element PD because the amount of light traversing the pipe 49 assumes different values in dependence on whether the air or gasoline is present within the pipe 49.

Figure 11:
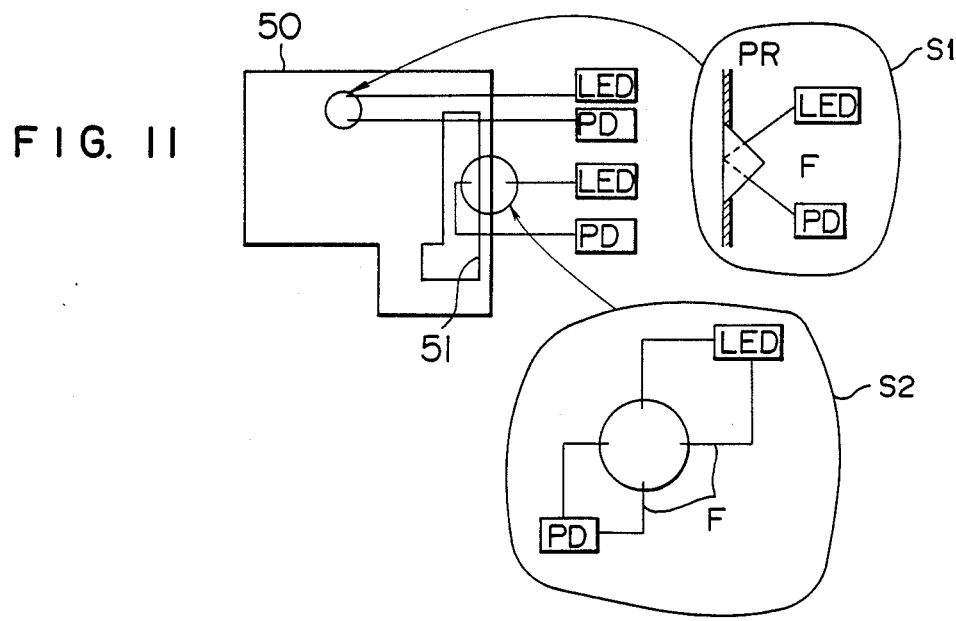
FIG. 11 is a schematic diagram showing a structure of an oil tank in which optical parts according to the present invention are employed.

FIG. 11 shows application of the optical part of the invention to an optical sensor for an oil tank of a motor vehicle for detecting the amount of oil and determining the use life thereof. The structure of the sensor mounted on the tank for detecting the amount of oil is shown clearly in a partially enlarged view encircled by a solid line S1 and is substantially identical with the prism-type sensor arrangements shown in FIGS. 9 and 10. On the other hand, a partially enlarged view encircled by a solid line S2 shows a sensor arrangement in which an optical sensor is mounted on an auxiliary pipe 51 of the oil tank 50 for determining the use life of oil. More specifically, a first optical part including the integral combination of a LED and optical fibers F and a second optical part including the integral combination of a photodiode and optical fibers are installed in diametrical opposition to each other across the auxiliary pipe 51 at such a position that engine oil is present between the ends o the optical fibers of the first and second optical parts. As is well known, in the course of time lapse, engine oil is progressively admixed with metal particles resulting from abrasion of various gears to be thereby contaminated. Consequently, the quantity of light emitted by the LED of the first optical part and received by the photodiode of the second optical part undergoes variation as a function of the amount of metal particles resulting from abrasion and admixed to oil interposed between the first and second optical parts and coloration due to deterioration of the oil. In this way, the use life of oil can be determined. By providing an alarm circuit in connection with the optical sensor mentioned above, the time at which oil is to be replaced can be determined, whereby maintenance of the engine mechanism can be practiced effectively.

In the applications described above, the optical part including a single light emitting or receiving element and a single light guide (optical fiber) or the optical part including a single light emitting or receiving element and a plurality of optical guides in the integral combination may be selectively employed in dependence on the purposes or functions for which the optical part is destined.

As will now be appreciated from the foregoing description, the present invention has provided an optical part which is in the form of an integral combination of a light emitting or receiving element and an light guide or guides and which exhibits excellent light transmission efficiency. The optical part according to the present invention can find its application in various and numerous apparatuses, equipment, machines, instruments and other inclusive of those for domestic use where utilization of the optical element of the similar or same type has been considered to be profitable but scarcely practiced because of difficulty and trouble involved in the connection between the light emitting or receiving element and the optical fiber. With the advent of the optical part according to the present invention which requires for its operation simply the direct connection of electrodes of the light emitting or receiving element to a relevant electric circuit without need for expensive connector and skillfulness, a great number of industrial fields inclusive of manufactures of apparatuses for home use are now in the position to take advantage of the optical part according to the invention.

Figure 12A:
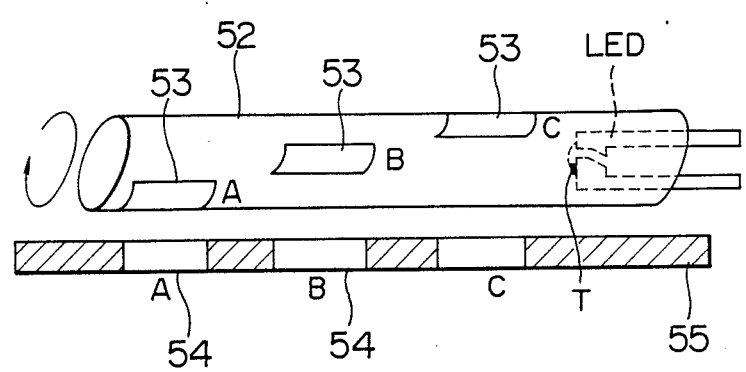
FIGS. 12A and 12B are schematic diagrams showing a structure of a display panel device in which an optical part according to the present invention can be employed.
Figure 12B:
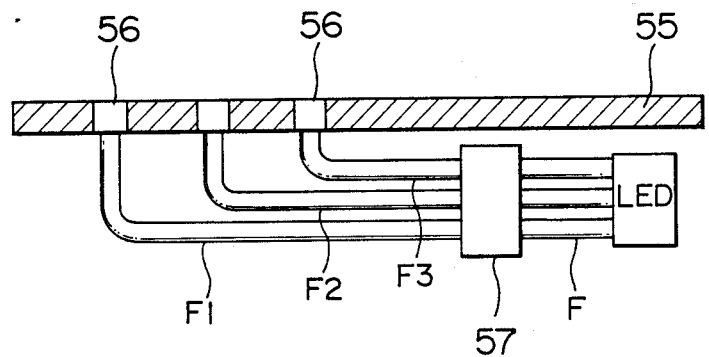

FIGS. 12A and 12B show exemplary applications of the optical part integrally including a light emitting element and a light guide to illumination of a display panel. In the case of the example shown in FIG. 12A, a cylindrical light transmission rod 52 having a diameter of 10 mm and formed of a core and a clad is used for the light guide. Discrete portions of the clad are subjected to heat treatment for thereby forming windows 53 to allow the light emitted by the light emitting element LED to leak externally. By disposing display fields 54 of the panel 55 in correspondence with the windows 53, the former can be illuminated with light leaking through the associated windows 53. The cylindrical light transmission rod 52 is rotatably supported. The rotation of the rod 52 is coordinated with operation of switch means (not shown) such that in an A-mode of operation of the illuminator, the window 53 labelled with "A" is positioned closely to the display field 54 labelled with "A" for illumination thereof. In the similar manner, the display fields labelled with "B" and "C" can be illuminated through corresponding coordination of rotation of the rod 52 and the switch means (not shown). Thus, with a single light source, a large number of display fields can be illuminated.

FIG. 12B shows an illuminator in which an optical part including a single LED and a plurality of optical fibers in the integral combination is used. More specifically, the optical fibers F1 to F3 are integrally coupled to a single LED element, wherein the tip ends of the individual optical fibers are fixedly connected to display windows 56 of a panel 55, respectively. By providing a switch device for intercepting the light beam at an intermediate portion of the optical fibers, illumination only of the preselected display field (5) can be realized.

The panel illumination described above, only by way of example, can be adopted in many industrial apparatuses, machines, instruments and other as well as those for domestic use.

Figure 13:
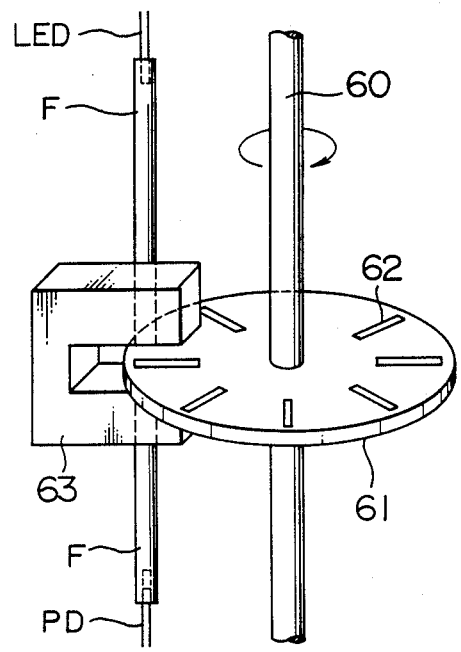
FIG. 13 is a pictorial perspective view showing a structure of a rotational speed meter in which an optical part according to the present invention is employed.
Figure 14A:
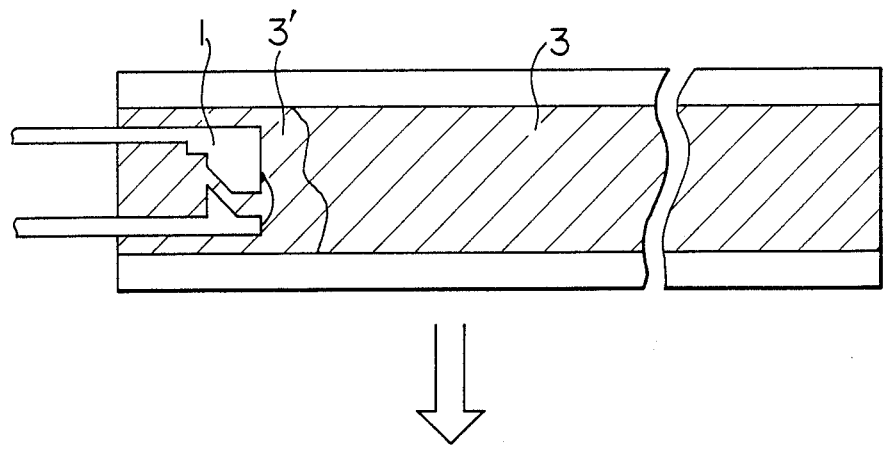
FIG. 14A and 14B are views for illustrating a structure of an optical part known in the art.
Figure 14B:
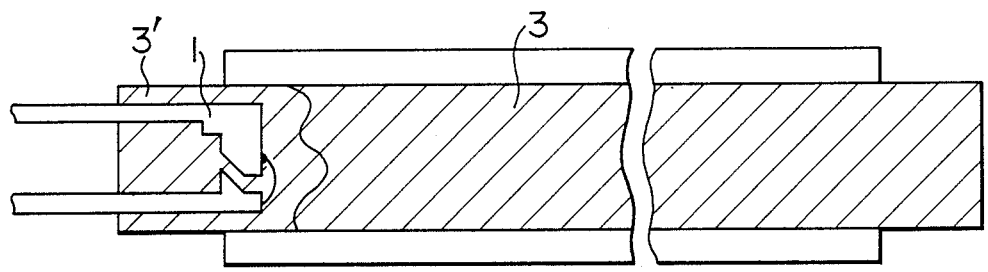
Figure 15A:
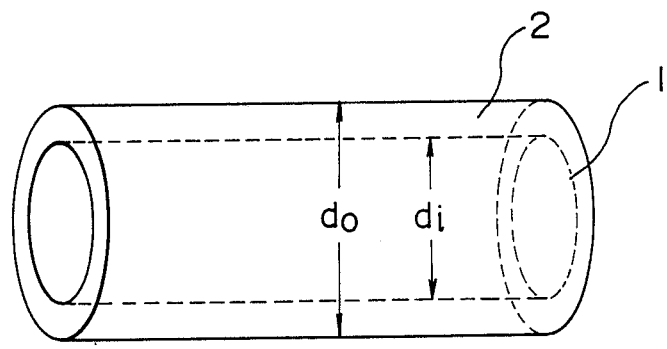
FIGS. 15A to 15C are views for illustrating the mechanism underlying the phenomenon in which a core material protrudes from a clad or a clad and jacket combination in an optical part at a high temperature.
Figure 15B:
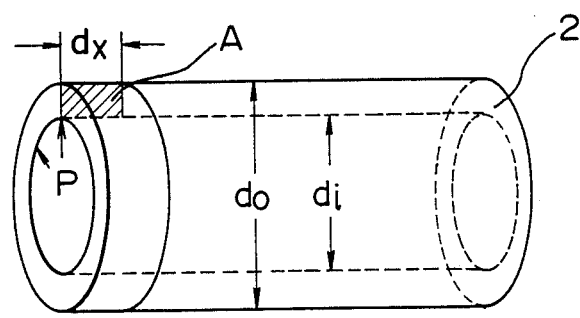
Figure 15C:
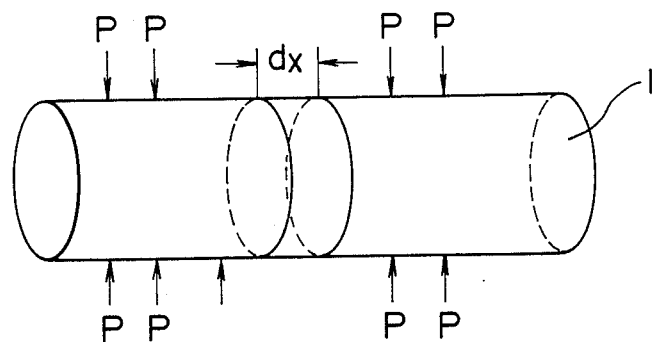

FIG. 13 shows an application of the optical part according to the invention to a rotational speed meter (tachometer). Referring to the figure, a disk 61 having a plurality of slits 62 formed in the peripheral portion thereof with equidistance therebetween is mounted on a shaft 60 of an apparatus of which rotation is to be measured or controlled. A first optical part comprising integrally a light emitting element LED and an optical fiber F and a second optical part including integrally a photodiode PD and an optical fiber are so disposed in legs of C-like sensor member 63, respectively, so that the light emitted by the LED element impinges on the photodiode PD through the slits 62 formed in the disk 61 as the shaft 60 is rotated. Thus, on the basis of the number of light pulses impinging on the photodiode PD, the number of revolution of the shaft 60 can be measured. The information thus obtained may be utilized for controlling the rotational speed of the shaft 60. The measurement of the revolution number of the shaft 60 as well as control thereof can be realized even when reflecting elements are provided in the disk in place of the slits so that the reflected light rays impinge on the photodiode of the second optical part.

As will be appreciated from the foregoing description, the optical part in which the light emitting or receiving element is formed integrally with the connector for connecting the element to the light guide (S) or fixedly and integrally coupled to the latter allows the light emitting or receiving element to be connected to the optical fiber or fibers in a much facilitated manner without need for any expensive connector or lens.

We claim:

1. An optical part for light transmission, comprising a light conductor composed of a core formed of a transparent macromolecular material and a clad or a combined clad and jacket formed of a macromolecular material having a smaller refractive index than that of said core material, and a light emitting and/or receiving element incorporated in said light conductor at least at one end portion thereof, wherein said core has a higher rigidity than that of said clad or said combined clad and jacket and wherein a macromolecular material combining said light emitting and/or receiving element integrally with said light conductor at the end portion thereof has a substantially same refractive index as that of the core material.

2. An optical part for light transmission according to claim 1, wherein said macromolecular material combining said light emitting and/or receiving element integrally with said light conductor at the end portion thereof is a transparent bridge-making (cross-linking) type resin.

3. An optical part for light transmission according to claim wherein the core material of said light conductor is a transparent bridge-making (cross-linking) type resin.

4. An optical part for light transmission according to claim 3, wherein said core material is a macromolecular material formed through polymerization of monomer compositions including monomers given by the following general formula (I):

$$CH_2=\underset{R_1}{\overset{|}{C}}-CO-(OCH_2-CH_2)_n-O-CO-\underset{R_2}{\overset{|}{C}}=CH_2 \quad (I)$$

where $R_1$ and $R_2$ represent H or $CH_3$ and n represents an integer in a range of 1 to 23.

5. An optical part for light transmission according to claim 3, wherein said core material is a macromolecular material formed through polymerization of monomer compositions including monomers given by the following general formula (I):

$$CH_2=\underset{R_1}{\overset{|}{C}}-CO-(OCH_2-CH_2)_n-O-CO-\underset{R_2}{\overset{|}{C}}=CH_2 \quad (I)$$

where $R_1$ and $R_2$ represents H or $CH_3$ and n represents an integer in a range of 1 to 23, and a monomer given by the following general formula (II):

$$CH_2=\underset{R_3}{\overset{|}{C}}-COO-R_4 \quad (II)$$

where $R_2$ represents H or $CH_3$ and $R_4$ represents H or a radical selected from a group of alkyls having carbons in a number of 1 to 18,

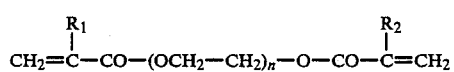

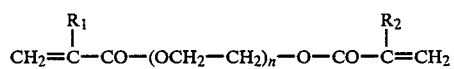

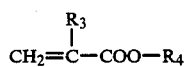

-continued

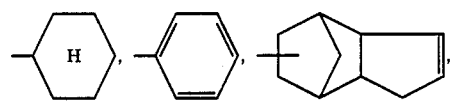

6. An optical part for light transmission according to claim 2, wherein said core material is a macromolecular material formed through polymerization of monomer compositions including monomers given by the following general formula (I):

$$CH_2=\underset{R_1}{\overset{|}{C}}-CO-(OCH_2-CH_2)_n-O-CO-\underset{R_2}{\overset{|}{C}}=CH_2 \quad (I)$$

where $R_1$ and $R_2$ represent H or $CH_3$ and n represents an integer in a range of 1 to 23, and a monomer given by the following general formula (II):

$$CH_2=\underset{R_3}{\overset{|}{C}}-COO-R_4 \quad (II)$$

wherein $R_3$ represents H or $CH_3$ and $R_4$ represents H or a radical selected from a group of alkyls having carbons in a number of 1 to 18,

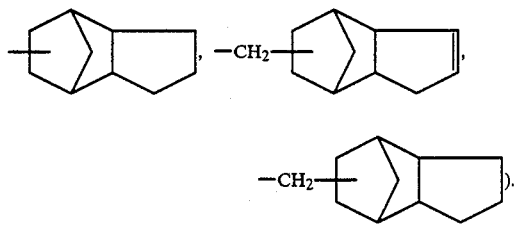

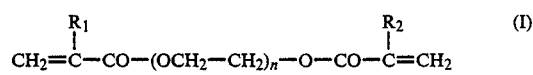

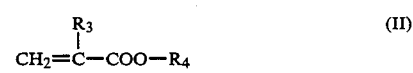

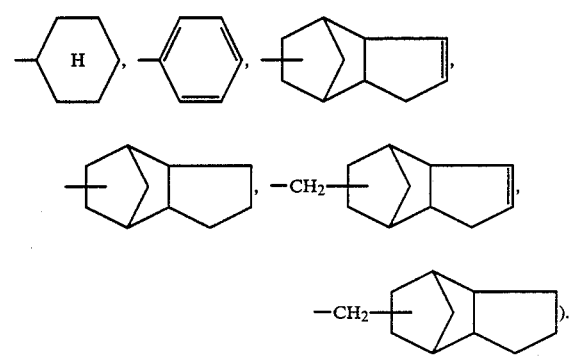

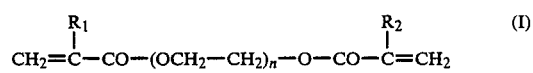

7. An optical part for light transmission according to claim 2, wherein said core material is a macromolecular material formed through polymerization of monomer compositions including monomers given by the following general formula (I):

$$CH_2=\underset{R_1}{\overset{|}{C}}-CO-(OCH_2-CH_2)_n-O-CO-\underset{R_2}{\overset{|}{C}}=CH_2 \quad (I)$$

where $R_1$ and $R_2$ represent H or $CH_3$ and n represents an integer in a range of 1 to 23.

8. An optical part for light transmission according to claim 1, wherein the core material of said light conductor is a transparent bridge-making (cross-linking) type resin.

9. An optical part for light transmission according to claim 8, wherein said core material is a macromolecular material formed through polymerization of monomer compositions including monomers given by the following general formula (I):

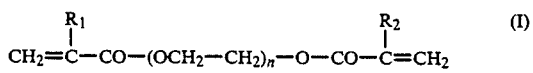

where $R_1$ and $R_2$ represent H or $CH_3$ and n represents an integer in a range of 1 to 23.

10. An optical part for light transmission according to claim 8, wherein said core material is a macromolecular material formed through polymerization of monomer compositions including monomers given by the following general formula (I):

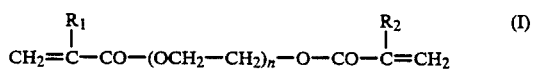

where $R_1$ and $R_2$ represent H or $CH_3$ and n represents an integer in a range of 1 to 23, and a monomer given by the following general formula (II):

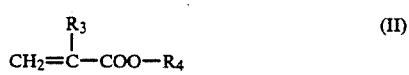

where $R_3$ represents H or $CH_3$ and $R_4$ represents H or a radical selected from a group of alkyls having carbons in a number of 1 to 18,

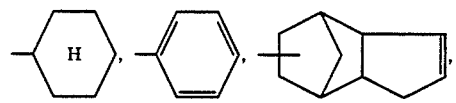

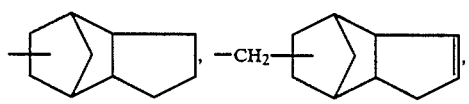

11. An optical part for light transmission according to claim 1, wherein said core material is a macromolecular material formed through polymerization of monomer compositions including monomers given by the following general formula (I):

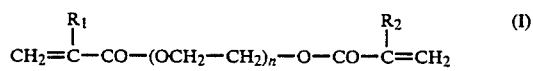

where $R_1$ and $R_2$ represent H or $CH_3$ and n represents an integer in a range of 1 to 23.

12. An optical part for light transmission, comprising a light conductor composed of a core formed of a transparent macromolecular material and a clad or a combined clad and jacket formed of a macromolecular material having a smaller refractive index than that of said core material, and a light emitting and/or receiving element incorporated in said light conductor at least at one end portion thereof, wherein said core has a higher rigidity than that of said clad or said combined clad and jacket and wherein a macromolecular material combining said light emitting and/or receiving element integrally with said light conductor at the end portion thereof has a substantially same composition as that of the core material.

13. An optical part for light transmission according to claim 12, wherein said macromolecular material combining said light emitting and/or receiving element integrally with said light conductor at the end portion thereof is a transparent bridge-making (cross-linking) type resin.

14. An optical part for light transmission according to claim 13, wherein the core material of said light conductor is a transparent bridge-making (cross-linking) type resin.

15. An optical part for light transmission according to claim 14, wherein said core material is a macromolecular material formed through polymerization of monomer compositions including monomers given by the following general formula (I):

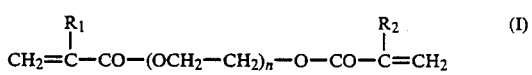

where $R_1$ and $R_2$ represent H or $CH_3$ and n represents an integer in a range of 1 to 23, and a monomer given by the following general formula (II):

where $R_3$ represents H or $CH_3$ and $R_4$ represents H or a radical selected from a group of alkyls having carbons in a number of 1 to 18,

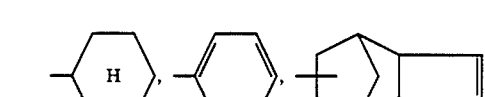

16. An optical part for light transmission according to claim 13, wherein said core material is a macromolecular material formed through polymerization of monomer compositions including monomers given by the following general formula (I):

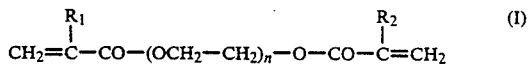

where $R_1$ and $R_2$ represent H or $CH_3$ and n represents an integer in a range of 1 to 23.

17. An optical part for light transmission according to claim 13, wherein said core material is a macromolecular material formed through polymerization of monomer compositions including monomers given by the following general formula (I):

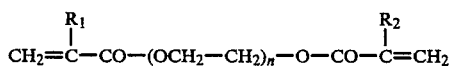   (I)

where $R_1$ and $R_2$ represent H or $CH_3$ and n represents an integer in a range of 1 to 23, and a monomer given by the following general formula (II):

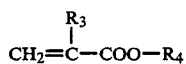   (II)

where $R_3$ represents H or $CH_3$ and $R_4$ represents H or a radical selected from a group of alkyls having carbons in a number of 1 to 18,

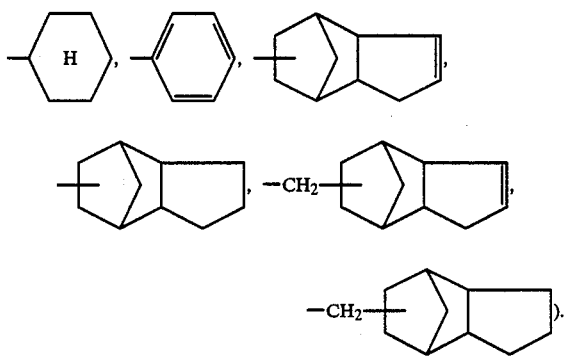

18. An optical part for light transmission according to claim 12, wherein the core material of said light conductor is a transparent bridge-making (cross-linking) type resin.

19. An optical part for light transmission according to claim 18, wherein said core material is a macromolecular material formed through polymerization of monomer compositions including monomers given by the following general formula (I):

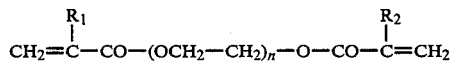   (I)

where $R_1$ and $R_2$ represent H or $CH_3$ and n represents an integer in a range of 1 to 23.

20. An optical part for light transmission according to claim 18, wherein said core material is a macromolecular material formed through polymerization of monomer compositions including monomers given by the following general formula (I):

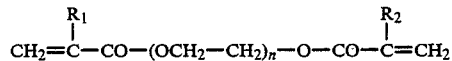   (I)

where $R_1$ and $R_2$ represent H or $CH_3$ and n represents an integer in a range of 1 to 23, and a monomer given by the following general formula (II):

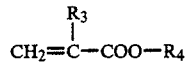   (II)

where $R_3$ represents H or $CH_3$ and $R_4$ represents H or a radical selected from a group of alkyls having carbons in a number of 1 to 18,

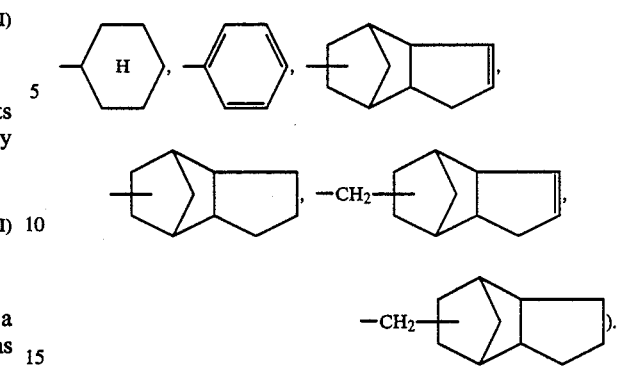

21. An optical part for light transmission according to claim 12, wherein said core material is a macromolecular material formed through polymerization of monomer compositions including monomers given by the following general formula (I):

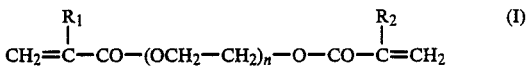   (I)

where $R_1$ and $R_2$ represent H or $CH_3$ and n represents an integer in a range of 1 to 23.

22. An optical part for light transmission, comprising a light conductor formed of a core of a transparent macromolecular material and a clad or a combined clad and jacket formed of a material having a smaller refractive index than that of said core material, and a light emitting and/or receiving element incorporated in said light conductor, wherein a plurality of said light conductors are included and combined together at one end portions thereof, said core has a higher rigidity than that of said clad or said clad and jacket combination, and wherein a macromolecular material combining said light emitting and/or receiving element integrally with said plurality of light conductors at said one end portions has a substantially same refractive index as that of said core material.

23. An optical part for light transmission according to claim 22, wherein the core material of said light conductor is a transparent bridge-making (cross-linking) resin.

24. An optical part for light transmission, comprising a light conductor formed of a core of a transparent macromolecular material and a clad or a combined clad and jacket formed of a material having a smaller refractive index than that of said core material, and a light emitting and/or receiving element incorporated in said light conductor, wherein a plurality of said light conductors are included and combined together at one end portions thereof, said core has a higher rigidity than that of said clad or said clad and jacket combination, and wherein a macromolecular material combining said light emitting and/or receiving element integrally with said plurality of light conductors at said one end portions has a substantially same composition as that of said core material.

25. An optical part for light transmission according to claim 24, wherein the core material of said light conductor is a transparent bridge-making (cross-linking) resin.

26. A method of manufacturing an optical part, comprising steps of:
preparing a light conductor composed of a core formed of a transparent macromolecular material and a clad formed of a transparent macromolecular material having a lower refractive index than that of said core material, said core material having a higher rigidity than that of said clad material;

removing the core material from an end portion of said light conductor;

placing a light emitting and/or receiving element in the end portion of said light conductor from which the core material has been removed; and combining said light emitting and/or receiving element integrally with said light conductor by a material having a substantially same refractive index as that of said core material.

27. A method according to claim 26, wherein said core material is a macromolecular material formed through polymerization of monomer compositions including monomers given by the following general formula (I):

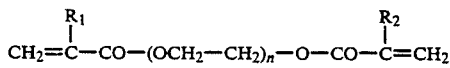

where $R_1$ and $R_2$ represent H or $CH_3$ and n represents an integer in a range of 1 to 23.

28. A method of manufacturing an optical part, comprising steps of:

forming a coupling member of a transparent macromolecular material having a substantially same refractive index as that of a clad of a light conductor and provided with a bore for inserting said light conductor therein and a bore for mounting therein a light emitting element and/or a light-receiving element;

inserting in said light conductor inserting bore a light conductor composed of a clad formed of macromolecular material having a lower refractive index than that of a core material forming a part of said light conductor, said core material having a higher rigidity than that of said clad material;

inserting said light emitting element and/or said light receiving element into the associated mounting bore; and combining said light emitting element and/or light receiving element integrally with said light conductor by molding with a macromolecular material having a substantially same refractive index as that of said core material.

29. A method according to claim 28, wherein said core material is a macromolecular material formed through polymerization of monomer compositions including monomers given by the following general formula (I):

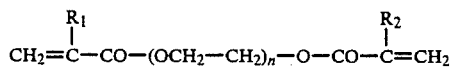

where $R_1$ and $R_2$ represent H or $CH_3$ and n represents an integer in a range of 1 to 23.

30. A method of manufacturing an optical part, comprising the steps of:

inserting into a molding die provided with more than one light conductor inserting portions and a mounting portion for a light emitting and/or receiving element, light conductors each including a clad formed of a macromolecular material having a smaller refractive index than that of a core material which has a higher rigidity than that of said clad material;

placing said light emitting and/or receiving element in said molding die;

molding said light emitting and/or receiving element with a macromolecular material having a substantially same refractive index as that of said core material; and coating the exposed portion of said core with a material having a substantially same refractive index as that of said clad material.

31. A method according to claim 30, wherein said core material is a macromolecular material formed through polymerization of monomer compositions including monomers given by the following general formula (I):

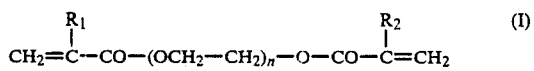

where $R_1$ and $R_2$ represent H or $CH_3$ and n represents an integer in a range of 1 to 23.

32. A light sensing device, comprising a light conductor formed of a core of a transparent macromolecular material and a clad or a combined clad and jacket of a macromolecular material having a smaller refractive index than that of said core material, and a light emitting and/or receiving element incorporated in said light conductor at least at one end portion thereof, wherein said core has a higher rigidity than that of said clad and wherein a macromolecular material combining said light emitting and/or receiving element integrally with said light conductor at the end portion thereof has a substantially same refractive index as that of said core material.

33. The light-sensing device according to claim 32, in combination with a casing and/or outlet conduit of a washing machine for detecting, respectively, the amount of water and/or contamination of the water therein.

34. The light-sensing device according to claim 32, in combination with a suction port of a vacuum cleaner for detecting the amount of dust in the air sucked via said port of said cleaner.

35. The light-sensing device according to claim 32, in combination with an auxiliary oil-containing pipe of an oil tank for detecting the amount of oil and/or contamination therein.

36. A rotational speed sensor including as detecting means the light-sensing device set forth in claim 32, and a rotating disk mounted on a shaft having slits through which light from the device is passed to determine the rotational speed of said shaft.

37. A light sensing device according to claim 32, wherein said core material is a macromolecular material formed through polymerization of monomer compositions including monomers given by the following general formula (I):

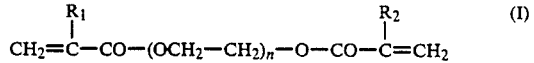

where $R_1$ and $R_2$ represent H or $CH_3$ and n represents an integer in a range of 1 to 23.

* * * * *